(12) United States Patent
Spraggs et al.

(10) Patent No.: US 11,831,757 B2
(45) Date of Patent: Nov. 28, 2023

(54) SYSTEM AND METHOD FOR GENERATING VIRTUAL PRIVATE KEYS FROM USER CREDENTIAL INFORMATION

(71) Applicant: SafeMoon US, LLC, Pleasant Grove, PA (US)

(72) Inventors: Lynn Spraggs, Vernon (CA); Robert Spraggs, Coldstream (CA)

(73) Assignee: SafeMoon US, LLC, Pleasant Grove, UT (US)

( * ) Notice: Subject to any disclaimer, the term of this patent is extended or adjusted under 35 U.S.C. 154(b) by 0 days.

(21) Appl. No.: 17/852,923

(22) Filed: Jun. 29, 2022

(65) Prior Publication Data

US 2023/0006820 A1    Jan. 5, 2023

Related U.S. Application Data

(60) Provisional application No. 63/216,842, filed on Jun. 30, 2021.

(51) Int. Cl.
*H04L 9/08* (2006.01)

(52) U.S. Cl.
CPC .......... *H04L 9/0825* (2013.01); *H04L 9/0866* (2013.01); *H04L 9/0894* (2013.01)

(58) Field of Classification Search
CPC .... H04L 9/0825; H04L 9/0866; H04L 9/0894
USPC .......................................................... 713/171
See application file for complete search history.

(56) References Cited

U.S. PATENT DOCUMENTS

| | | | |
|---|---|---|---|
| 10,601,829 B1 * | 3/2020 | Nelson | G06F 16/954 |
| 2014/0304068 A1 * | 10/2014 | Weinblatt | G06Q 30/0248 |
| | | | 705/14.47 |
| 2019/0245688 A1 * | 8/2019 | Patin | H04L 9/321 |
| 2020/0127835 A1 * | 4/2020 | Fletcher | H04L 9/3226 |
| 2021/0073796 A1 * | 3/2021 | Hennebert | H04L 9/0637 |
| 2021/0105139 A1 * | 4/2021 | Choi | H04L 9/0869 |
| 2021/0266150 A1 * | 8/2021 | Ornelas | H04L 9/0643 |
| 2022/0166638 A1 * | 5/2022 | Razi | H04L 9/3278 |

OTHER PUBLICATIONS

Wai Kok et al, Evolution of Bitcoin Addresses from Security Perspectives, 2020, 15th International Conference for Internet Technology and Secured Transactions (ICITST (Year: 2020).*
International Search Report and Written Opinion for related PCT application PCT/US22/39164, dated Sep. 16, 2022.

* cited by examiner

*Primary Examiner* — Moeen Khan
(74) *Attorney, Agent, or Firm* — William Gray Mitchell

(57) ABSTRACT

A system for generating a virtual private key using personal credentials, comprising: personal knowledge and a suite of algorithms and methodologies integrated, without using third party information, in such a manner that the private key can be securely generated without exposing the credentials entity.

7 Claims, 3 Drawing Sheets

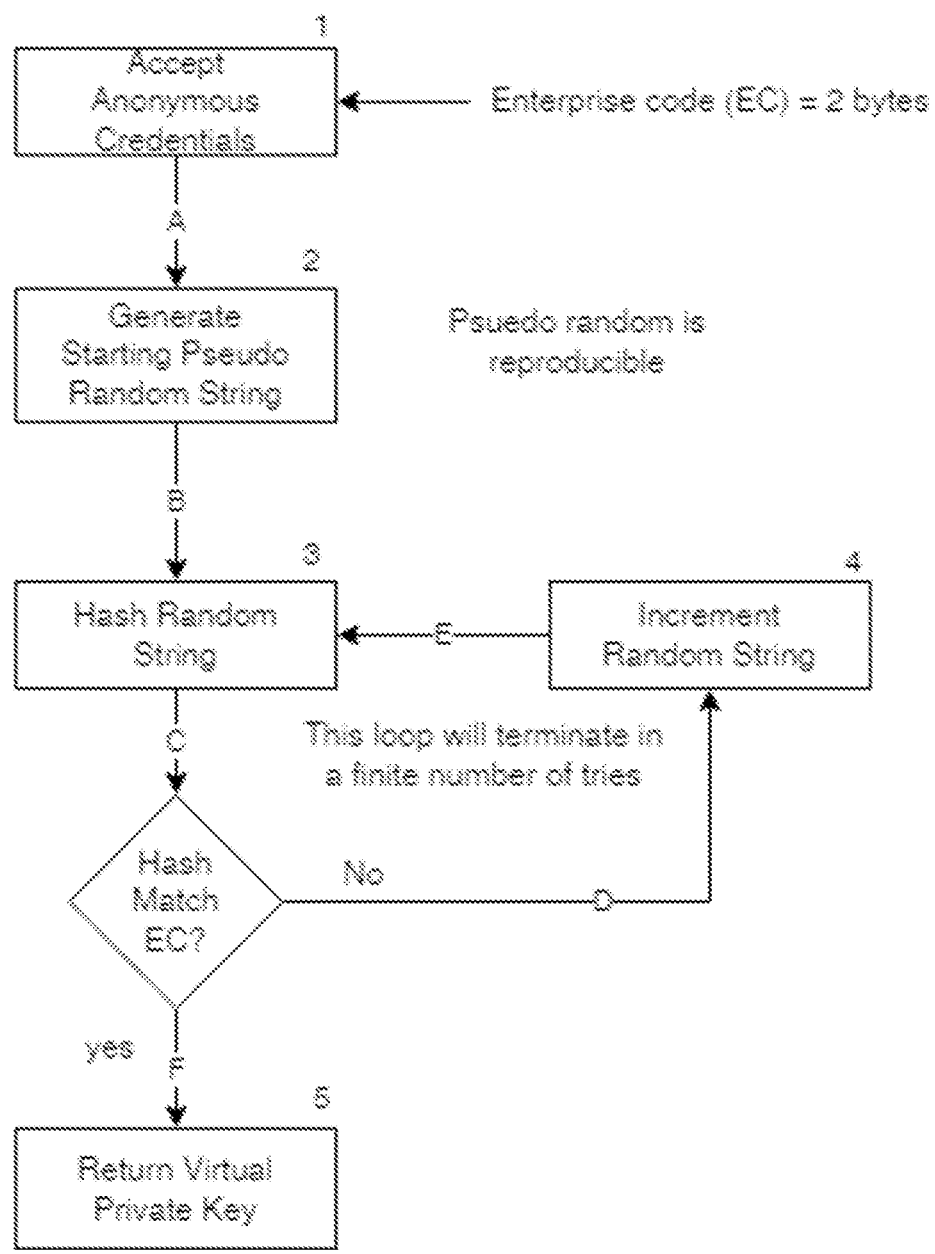

SYSTEM AND METHOD FOR GENERATING VIRTUAL PRIVATE KEYS FROM USER CREDENTIAL INFORMATION

CROSS REFERENCE TO RELATED APPLICATIONS

This application claims priority to U.S. provisional patent application Ser. No. 63/216,842, filed on Jun. 30, 2021.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The disclosure relates to the use of virtual private and public keys for commercial activities.

Background of the Invention

Cloud computing and storage provide users with the capability to store and process their data in third party data centers. Data communication between users and service provides requires that providers ensure that all critical data (credit card numbers, for example) are masked or encrypted and that only authorized users have access to data in its entirety. Moreover, digital identities and credentials must be protected, as should any data that the provider collects or produces about customer activity in the cloud.

There are numerous security threats associated with cloud data services. This includes traditional threats and non-traditional threats. Traditional threats include network eavesdropping, illegal invasion, and denial of service attacks. Threats specific to cloud computing also include side channel attacks, virtualization vulnerabilities, and abuse of cloud services. To mitigate these threats, security controls often rely on monitoring the three areas: confidentiality, integrity and access controllability. This disclosure concerns access controls.

Access controllability means that a data owner can perform the selective restriction of access to their data outsourced to the cloud. Legal users can be authorized by the owner to access the data, while others cannot access it without permission. Access control can also be referred to as availability. While unauthorized access should be strictly prohibited, access for administrative or even consumer uses should be allowed but monitored as well. Availability and access control ensure that the proper amount of permissions is granted to the correct persons.

The use of virtual security keys to give private users virtual access to cloud-based or data stored by or on behalf of service providers is known in the commercial marketplace. These keys may be used to exchange information in a secure manner. The users often desire to be able to securely exchange the data without the possibility of a third party being able to intercept the data and recover the information.

An example of such a situation is an accounting firm that needs to send financial information to a client. The institution must first establish a trust relationship with the client and then utilize this trust relationship to send information securely.

Two types of keys are currently used to encrypt and decrypt data shared between users and services providers: asymmetric keys and symmetric keys. Each key is a known type of algorithm, but each type is substantially different in that asymmetric keys are embodied as a private and public key pair whereas, a symmetric key is the same for both encryption and decryption. A private key, in all cases, must be kept secret. Private keys are typically not shared between the sender and receiver of the encrypted sensitive information. Currently, a shared symmetric key is used to encrypt and decrypt the data in systems using public and private keys derived from large prime numbers, such as a Public Key Infrastructure (PKI) type key.

In these PKI systems, one of the keys is used to encrypt the data and the other is used to decrypt the data. Traditionally, the public key is shared and is used to encrypt the data and the private key is kept secret and is used to decrypt the data. The problem is that the amount of data that can be encrypted is limited by the size of the modulus of the two keys. A public key with a modulus of 1024 bits can only encrypt a string which is 16 bytes in length. Thus, the PKI system is used to share a symmetric key which can then be used to encrypt any amount of data. It is obvious that the strength of the system is therefore commensurate with the length of the symmetric key that can be shared. It would be preferable to have a system that produced a larger symmetric key. If symmetric keys are used, then they must be the same for both encryption and decryption. Therefore, to effectively use symmetric keys, it is necessary to securely transport the shared key to another party. Thus, a lost PKI private key causes many problems, mostly associated with the necessary revocation of the public key. In order to alleviate this issue in web transactions, the public and private keys are used to share a symmetric key between the two parties. An example of sharing symmetric keys is Secure Socket Layer (SSL).

Using shared symmetric keys removes this restriction, but in this case, it becomes necessary to establish a trust relationship between the two parties in order to share the keys. As a general rule, the symmetric keys are shared using a PKI related system.

The current virtual key methodology solves two problems. First, there is a need for a system allowing parties to exchange data without having to set up a trusted relationship. Second, there is a need for a system to generate public and private keys that are both persistent and easily regenerated. This methodology will provide at least the same level of security associated with traditional cryptographic functionality, but removes many of the barriers associated with traditional security, including the need for Certificate Authorities and Revocation Lists. The methodology will provide systems with the ability to secure stored operational data in a manner that only can be accessed by the authorized user and will be impervious to traditional forms of breach attempts. In some cases the information used by the system will be derived from the encrypted data stored on the device rather than being stored on the device for use.

BRIEF DESCRIPTION OF THE INVENTION

In a preferred embodiment, a system for generating a virtual private key to be used to establish a trust relationship between a user and one or more entities, the system comprising:
  a user device with a processor and a memory;
  a credential factory comprising a private key miner;
  a credential generator;
wherein the credential factory generates a virtual private key at the user's request, the credential factory obtains user credentials through the credit generator, the virtual private key is optionally stored by the user and the credit factory generates a separate public key that is associated with the virtual private key.

In another preferred embodiment, the system for generating a virtual private key as described herein, wherein the anonymous user credentials are sent by the credential generator to a secure escrow server with a secure escrow database.

In another preferred embodiment, the system for generating a virtual private key as described herein, wherein the user credentials comprise personal information of the user not known publicly.

In another preferred embodiment, the system for generating a virtual private key as described herein, wherein the system employs the user credentials and a suite of algorithms and methodologies to generate secure a private key without exposing the user credentials, and thus requiring no third party information to generate the key.

In another preferred embodiment, the system for generating a virtual private key as described herein, wherein the virtual private key derives mnemonic words, further comprising a digital wallet on the user device for storing encrypted random information on a user device RAM, wherein the system uses the encrypted random information to derive and make available the virtual private key and the mnemonic words only when the user is actively using an algorithm that engages the system.

In another preferred embodiment, the system for generating a virtual private key as described herein, wherein the private key is not stored in any database and is maintained only in a virtual state; whenever the private key is needed it can be regenerated from the knowledge of the user by first generating anonymous credentials and then passing these anonymous credentials to the private key miner; and all other components of the system that do not require secrecy can be stored as normal.

In another preferred embodiment, a method of using the system for generating a virtual private key as described herein, comprising the steps of:
  1. Downloading the credential factory to the memory of the user device;
  2. Providing an interface with the user and the credential generator allowing user to input personal credentials;
  3. Requesting the credential factory to make a virtual private key;
  4. Transferring credentials from the credential generator to the credential factory;
  5. Generating the virtual private key with the credential factory using the anonymous credentials;
  6. Generating a public key associated with the virtual private key with the credential factory;
  7. Storing the public key on the user device storage; and
  8. Optionally, storing the anonymized personal credentials associated with the virtual private key to a secure escrow server and secure escrow database.

BRIEF DESCRIPTION OF THE DRAWINGS

FIG. 3 is a flow chart evidencing steps in the private key miner feature of the system of FIG. 1.

DETAILED DESCRIPTION OF THE INVENTION

Figure 1:
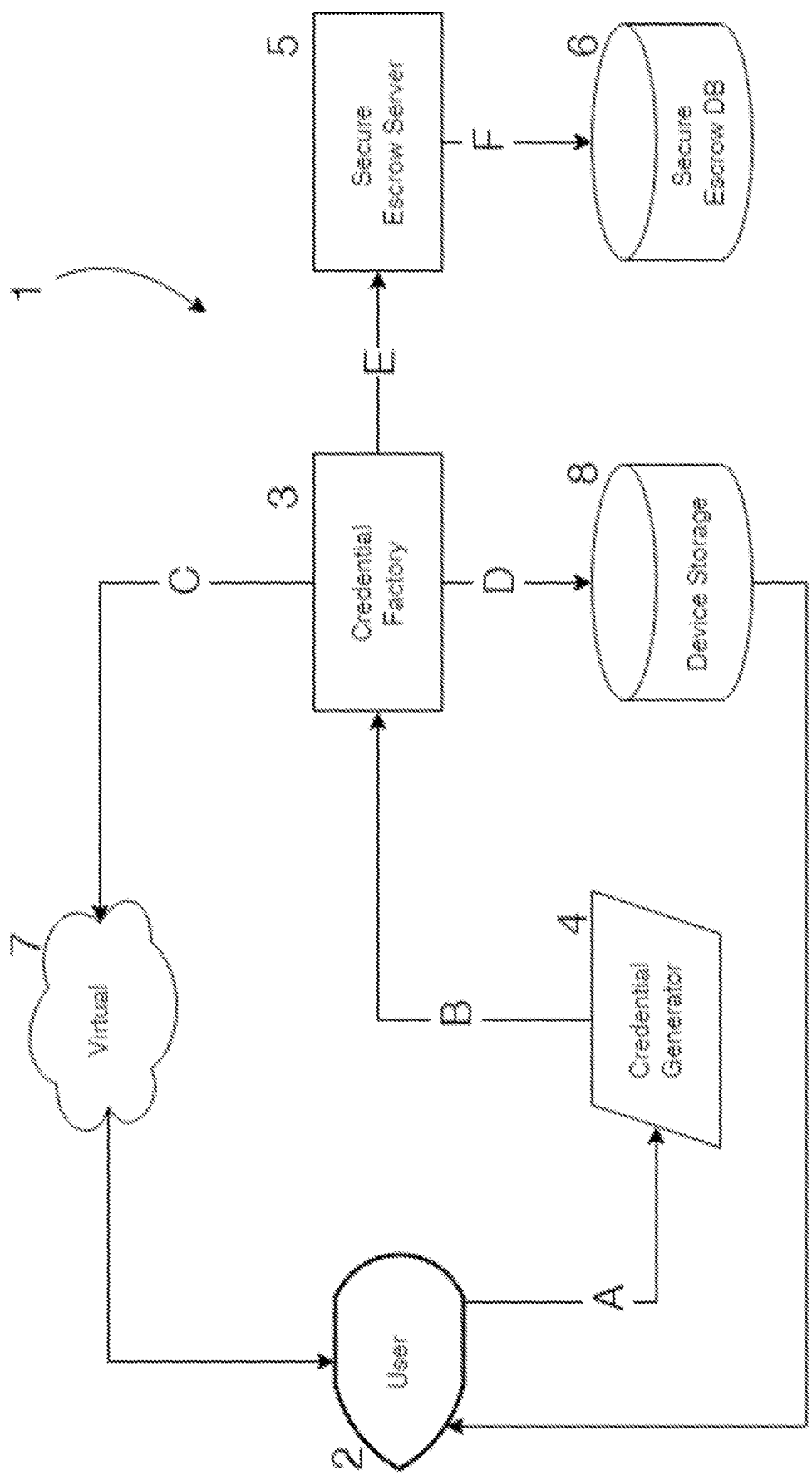
FIG. 1 is a schematic drawing evidencing an overview of one example of the system and method of virtual private keys disclosed herein.

The inventive generation of a virtual private key, in one example, is used to share data between two or more entities. At the same time, the virtual private key can be used in commercial endeavors such as Crypto Currency. The inventive private key is established from the personal credentials of an individual and could also be salted with other personal information.

This methodology makes provision for securely storing the credentials on a remote secure repository using the inventive methodologies contained herein. One example of the disclosed system uses information and data, comprising: personal user knowledge and a suite of algorithms and methodologies integrated in such a manner that a private key can be securely generated without exposing the credential entity, such as a username and a password chosen by the user. In one embodiment, no third-party information is required to generate the key. The user credentials are passed through non-reversible methodologies that render them anonymous. In the present system, hashing algorithms and randomizing algorithms are used in the virtual key generation and regeneration process.

One example of this embodiment would be the registration of a user into a system, wherein the user must provide an acceptable username and password. These user credentials would then be used to generate a pseudo random string, which string would then be used to generate the private key. The properties of the resulting private key are that it can be regenerated and that it can be virtual. Additionally, because it is user knowledge, the username and the password do not need to be stored on any system. In the present case to be compatible with existing systems, the private key is generated in such a manner that it can be used in commerce. More specifically, the private key can be used to generate a valid sequence of 24 words selected from a list of 2048 words that is valid for crypto wallets. While there are other methodologies for generating this list, the present inventive method begins with user credentials. The user credentials cannot be obtained by reversing the process.

The present invention makes use of the properties of Elliptic curves to generate appropriate private and public keys. While the use of these Elliptic curves is well known, the methodology described herein is unique and innovative. The methodology makes use of a "mining" process inside the CF to generate a 32 byte (8 bits each) string that will produce a sequence of 24 words from a list of 2048 commonly known words. These 24 words are the basis for forming private keys in Crypto Currency, for example. For further clarification it should be noted that there are two mutually exclusive public keys that can be generated from this methodology, namely, the public key derived from the virtual private key and the public key derived from the key derived from the word sequence. One of these public keys is appropriate for Crypto currency and the other is appropriate for sharing data.

In a primary embodiment, the inventive system is not limited to sharing data with one other entity. Rather, there is a provision for multiple entities to securely share the information. This embodiment relates to the formation and use of the private key as the public key can be derived from this private key. The system as designed does NOT require the use of any current public key infrastructure. The system is unique and inventive in that the credentials of the owner are not available to any other party, the private key may never be stored or exposed to the underlying system and may be virtual in that it can easily be regenerated. For convenience, the private key could be stored encrypted with a strong encryption key.

One primary embodiment of the system and method is pictured in FIG. 1, detailed herein below. In this embodiment, the public key and private key cannot be tampered with or forged without discontinuing access to the data. If either key is tampered with or forged, the decryption of the information will fail because there will not be a one-to-one relationship between the keys. The system will know immediately if the keys have been tampered with, as the authentication of the user will fail immediately, before any access to any encrypted data can start to occur. In this system, inherently any data encrypted with the credentials is secured until the necessary authentication credentials can be entered and verified. The methodology makes use of the inventive step that authentication can be achieved by the success or failure of encryption and decryption rather than by comparing credentials.

One advantage of this type of a system is that it is possible to provide an effective trust system without exposing the critical private key. If a user's device is lost or stolen, a new private key and associated data can be regenerated using the users' personal credentials. The credentials can be strong, but they should be in the realm of being memorable.

In another primary embodiment, a system for generating a virtual private key as described, wherein the system employs the user's personal information and a suite of algorithms and methodologies integrated in such a manner that a private key is securely generated without exposing the credentials entity, such that no third-party information is required to generate the key. An example of this mechanism in action would be a Cryptocurrency wallet where the data is required to be secured and not exposed to anyone. Once the registration is completed, the information stored in the wallet is mathematically calculated to create the private key, which is used to derive mnemonic words. While most wallets will store the private key, mnemonics and the password for authentication purposes on the device with some minimal form of protection, that data can be exposed if the device is lost or stolen. This mechanism will not store any of that information, nor will it store any credentials associated with the user on the device. The private key and mnemonics for the wallet are derived only when needed from the encrypted random information stored in the wallet and held in RAM for the duration of the session. This protects the sensitive information, since it is only available in RAM during and active session and only when required by the user. When the session ends, that sensitive information is removed from RAM and cannot be derived from the device if it is lost or stolen. This mechanism allows the wallet to be secure from intrusion whenever the session is inactive.

Detailed Drawing Description

FIG. 1 is an overview of one example of the system and method of virtual private keys disclosed herein and begins with a client/user using a user device 2 comprising a personal mobile device, a tablet or a personal computer to set up a secure transaction. In this illustration, the client has already installed a Credential Factory 3 ("CF") to the client's local device. Each CF comprises a "miner" embodied as software operating according to the process of FIG. 3, described herein below. In the figures, system components are annotated with numbers and steps are annotated with letters.

In step A, the user sends a request to the locally installed CF 3 to establish a virtual key using the users' specific credentials. This may happen automatically as a part of the transaction setup interface. Step A first goes to the Credential Generator 4 ("CG").

In step B, the CF 3 server obtains credentials from the user through the CG 4 by first soliciting user credentials from the user device 2 and then creating anonymous credentials from the user supplied credentials. The CG 4 is configured to select the appropriate credentials for this user. Credentials can consist of usernames, passwords, answers to questions and even reproducible biometrics or information retrieved from wearable devices and hardware tokens. The CF 3 ingests the anonymous credentials and generates a reproducible private key. As a note, the CG 4 is a component of the CF 3 although, in another embodiment one could have the CG 4 and the CF 3 as separate components and the CF 3 component could be local or remote or, alternatively the CG 4 and CF 3 could be in a client server relationship. The private key can be of any strength proportionate to the user credentials that are used for generation.

In step C, the CF 3 makes the generated private key available virtually, in device RAM or alternatively, it could be transmitted through the internet or otherwise for use by the user. This key in the present example does not need to be displayed or stored.

In step D, the CF 3 generates an associated public key and sends that public key with other data to a storage device 8, comprising a storage container/memory of the user device 2. This storage device 8 can be embodied as a local disk storage or an associated device like a hard drive or remotely in a cloud. The stored data does NOT need to be secure and is in fact intended for public use.

In step E, the secret anonymous credentials of the user can be sent to an associated secure escrow server 5 as a backup so that the user 2 can retrieve the credentials in the event that the user can no longer generate them. It is not possible to reverse the anonymous credentials into user credentials and the anonymous credential in escrow is worthless without associated personal information. The secure escrow server 5 may then save the anonymous credentials onto an associated secure escrow database 6 in an optional Step F.

Figure 2:
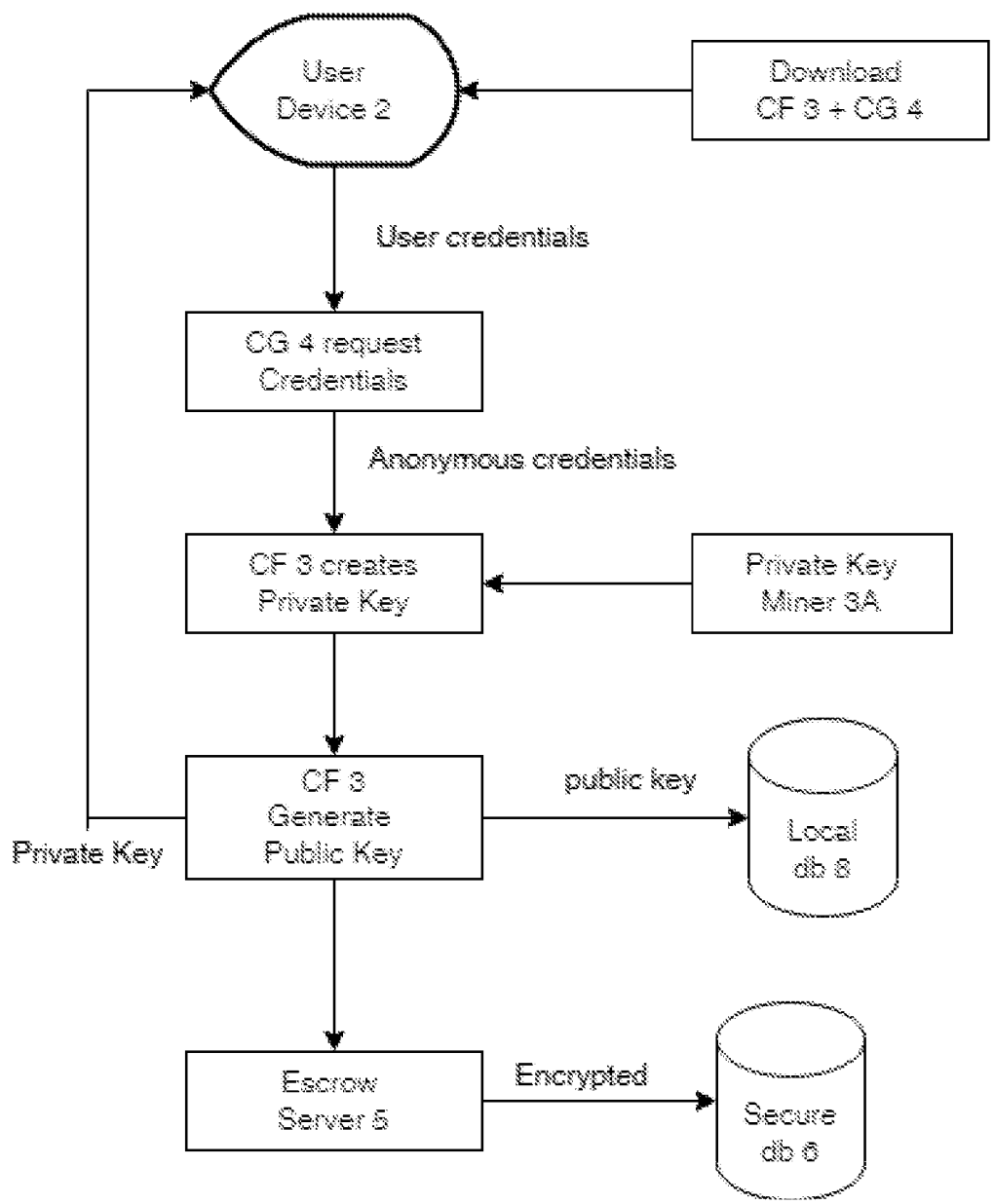
FIG. 2 is a flow chart evidencing steps in the inventive method of using the system of FIG. 1.

FIG. 2 is a flow chart evidencing steps in the inventive method of using the virtual key system 1 shown in FIG. 1, comprising the following steps:

1. Downloading the credential factory to the memory of the user device;
2. Providing an interface with the user and the credential generator allowing user to input personal credentials;
3. Requesting the credential factory to make a virtual private key;
4. Transferring credentials from the credential generator 4 to the credential factory 5;
5. Generating the virtual private key with the credential factory 3 using the anonymous credentials;
6. Generating a public key associated with the virtual private key with the credential factory 3;
7. Storing the public key on a user device storage 8; and 8. Optionally, storing the anonymized personal credentials associated with the virtual private key to a secure escrow server 5 and secure escrow database 6.

FIG. 3 is a flow chart showing the private key miner 3A and related method to return a Virtual Private Key ("VPK") to the user, derived from the anonymous credentials ("AC") that the system received that are unique to the user.
1. Step A is to receive the AC from the registering device.
   a. Included in the AC is a 2-byte Enterprise Code ("EC").
      i. The EC is used to distinguish the registering system.
2. Step B receives the AC and then passes them through a process to generate a Pseudo-Random String ("PBs").
   a. The PBs is reproducible by giving the same AC and EC to the Generator.
3. Step C hashes the PBs and looks to match it against the EC.
   a. Step F, if the hash matches then go to 5.
   b. Step D, if the hash does not match then go to 4.
4. Increment the Random String.
   a. The PBs is increased by one and then returned to 3 to be checked again.
   b. This procedure occurs until the valid hash is matched.
5. Step F returns the VPK to the system.

INDEX OF PARTS

1 virtual key system
2 User device
3 Credential factory (CF)
3A Private key miner
4 Credential generator server (CG)
5 Secure escrow server
6 Secure escrow database
7 Virtual key
8 User device storage The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A system for generating a virtual private key from a user's credentials, the system comprising:
   a user device with a processor and a memory;
   a credential factory comprising a private key miner, wherein the credential factory generates the virtual private key through a mining process comprising the following steps:
   receiving, from a user a request to generate the virtual private key based on the user's credentials;
   generating, a user's anonymous credential from the user's credentials, wherein the user's anonymous credentials includes a 2-byte Enterprise Code (EC);
   feeding, the user's anonymous credentials to the private key miner to form a Pseudo-Random String ("PBs"), wherein the PBs is reproducible based on the user's anonymous credential and the EC;
   hashing, the PBs to form a hashed PBs;
   comparing, the hashed PBs to the EC to find a match between the EC and the hashed PBs;
   in response to determining that the EC and the hashed PBs do not match:
      increasing the PBs by one;
      and repeating the hashing and the comparing steps until the match is found;
   in response to determining that the EC and the hashed PBs do match:
      designating final PBs as the virtual private key; and
      delivering the virtual private key to the user, wherein the virtual private key derives 24 mnemonic words.

2. The system for generating a virtual private key of claim 1, wherein the user's anonymous credentials are sent by a credential generator to a secure escrow server with a secure escrow database.

3. The system for generating a virtual private key of claim 1, wherein the user's anonymous credentials comprise personal information of the user not known publicly.

4. The system for generating a virtual private key of claim 3, wherein the system employs the user's anonymous credentials and a suite of algorithms and methodologies to securely generate the virtual private key without exposing the user's credentials.

5. The system for generating a virtual private key of claim 4, further initiating a digital wallet on the user device for storing information on the user device and the virtual private key is used for encrypting the information on the user device, wherein the system uses the user's anonymous credentials to derive and make available the virtual private key and the 24 mnemonic words only when the user is actively using an algorithm running on the system to generate the virtual private key.

6. The system for generating a virtual private key of claim 1, wherein:
   the virtual private key is not stored in any database and is maintained only in a virtual state;
   whenever the virtual private key is needed it can be regenerated from personal information of the user by first generating anonymous credentials and then passing these anonymous credentials to the private key miner.

7. The system for generating the virtual private key of claim 1, further comprising the steps of:
   downloading, the credential factory to the memory of the user device;
   providing, an interface with the user and a credential generator allowing the user to input the user's credentials;
   requesting, the credential factory to generate the virtual private key;
   transferring, the user's anonymous credentials from the credential generator to the credential factory;
   mining, the virtual private key with the credential factory using the user's anonymous credentials;
   generating, a public key associated with the virtual private key with the credential factory; and
   storing, the public key in the memory of the user device.

* * * * *